United States Patent [19]
Malofsky et al.

[11] Patent Number: 5,868,417
[45] Date of Patent: *Feb. 9, 1999

[54] ROLLABLE CHILD CARRIER STRUCTURE

[75] Inventors: Adam G. Malofsky, Huntington; Bernard M. Malofsky, Bloomfield, both of Conn.; Paul R. Glassberg, Chester, N.J.

[73] Assignee: Piccolino, LLC, Huntington, Conn.

[*] Notice: The term of this patent shall not extend beyond the expiration date of Pat. No. 5,702,120.

[21] Appl. No.: 725,981

[22] Filed: Oct. 4, 1996

Related U.S. Application Data

[63] Continuation-in-part of Ser. No. 501,505, Aug. 9, 1995, Pat. No. 5,702,120.
[51] Int. Cl.$^6$ ....................................................... A63C 9/00
[52] U.S. Cl. ............................................ 280/642; 280/650
[58] Field of Search ..................................... 280/642, 641, 280/644, 649, 650, 651, 657, 658, 639

[56] References Cited

U.S. PATENT DOCUMENTS

| | | | |
|---|---|---|---|
| 4,333,978 | 6/1982 | Kocher | 428/158 |
| 4,610,460 | 9/1986 | Kassai | 280/650 |
| 5,088,735 | 2/1992 | Shigetoh | 273/80 B |
| 5,205,578 | 4/1993 | Liu | 280/642 |
| 5,533,215 | 7/1996 | Malofsky et al. | 5/99.1 |
| 5,702,120 | 12/1997 | Malofsky et al. | 280/642 |
| 5,704,530 | 1/1998 | Scherer | 224/632 |
| 5,716,095 | 2/1998 | Lopez | 297/184.13 |
| 5,747,129 | 5/1998 | Malofsky | 428/36.4 |

*Primary Examiner*—Brian L. Johnson
*Assistant Examiner*—Bridget Avery
*Attorney, Agent, or Firm*—William A. Simons; Wiggin & Dana

[57] ABSTRACT

A rollable child or infant carrier structure having a rollable base and a multi-side enclosing frame, wherein the frame has solid composite sectors made of lightweight high modules fiber-reinforced plastic matrix solid composite members.

8 Claims, No Drawings

ROLLABLE CHILD CARRIER STRUCTURE

CROSS-REFERENCE TO RELATED APPLICATIONS

This is a continuation-in-part application of U.S. patent application Ser. No. 08/501,505, filed on Aug. 9, 1995 now U.S. Pat. No. 5,702,120. That patent application is incorporated herein by reference in its entirety.

BACKGROUND OF THE INVENTION

1. Field of Invention

The present invention relates to stroller or baby carriages ("rollable child carrier structure") that are constructed of a novel composite material.

2. Brief Description of the Art

Numerous patents are directed to the design and specific materials for strollers and baby carriers. Most involve the use of steel or aluminum frames.

U.S. Pat. No. 5,205,578 involves the use of injected molded; thermoplastic material in strollers. However, certain problems exist with the use of this material in strollers and baby carriages.

These problems include (1) the use of very expensive molding operations and capital costs; (2) the resins specifically cited (i.e., polypropylene and nylon) cannot carry the required loads without massive distortion of the stroller or carriage frame over time or during use unless special and non-readily available thermoplastic resins are used; (3) any thermoplastic resin currently available that can carry the loads without distortions (e.g., polycarbonate resins) are expensive and very difficult to process; (4) thermoplastic resins are generally difficult to paint or coat because of their inherent low surface tension; (5) a plastic stroller annotates a cheaply made item vis-a-vis comparable shaped metal materials; and (6) the use of thermoplastic material that does not distort will have to be very thick.

Thus, a need existed for a stroller or baby carriage made out of a better material than metals or injection molded plastic materials. U.S. Pat. No. 5,702,120 (Malofsky et al.), describes improved materials and an improved design for reliable child carrier structures, such as strollers which overcomes the problems associated with above-described materials. The lightweight, high modulus fiber-reinforced plastic matrix composite tubing materials described in U.S. Pat. No. 5,702,120 provide lightweight, durable, strong, stiff noncorroding parts that feel and sound like metal, and allow for a design that is itself lightweight, of consistent quality, safe, durable and easily folded, stored and transported, all at a relative low cost. While these tubing materials can be used for the vast majority of stroller frame parts and represent a large improvement over the prior art metal and plastic frame parts, there are certain situations where the stroller parts must have more stiffness and be more amenable to different types of fabrication on assembly with either each other or other materials such as fabrics. The present invention offers a solution to those problems.

BRIEF SUMMARY OF THE INVENTION

Specifically, one aspect of the present invention is directed to a child or infant reliable carrier structure comprising a rollable base and a multi-side enclosing frame wherein said frame comprises solid member sections made of lightweight, high modulus fiber-reinforced plastic matrix solid composite members having a weight of 0.35 pounds or less per lineal foot: and wherein the plastic matrix is a thermoplastic resin or thermoset plastic resin with a minimum modulus of 250,000 psi; a minimum tensile strength of 6,000 psi; and a glass transition temperature of at least 50° C. and wherein said high modulus fiber reinforcement is selected from the group consisting of carbon fibers, aramid fibers, glass fibers, polyolefin fibers, boron fibers, and mixtures thereof.

Another aspect of the present invention is to use this solid composite member sections in stroller or baby carriage designs disclosed in U.S. Pat. No. 5,702,120.

DETAILED DESCRIPTION OF THE PREFERRED EMBODIMENTS

The term "composites" as used in the present specification and claims is defined as those materials found by distributing extremely strong and stiff, continuous, chopped, or a mixture of fibers in a polymer resin matrix or binder.

The term "high modulus fiber reinforcement" as used in the present specification and claims is defined as a collection of fibers employed possessing an average modulus of at least 5,000,000 psi, preferably 15,000,000 psi, and most preferably at least 30,000,000 psi.

The term "plastic resin matrix or binder" as used in the present specification and claims is defined as any thermoset or thermoplastic resin with a minimum modulus of about 250,000 psi, preferably about 325,000 psi, and most preferably, at least about 400,000 psi; a minimum tensile strength of about 6,000 psi, preferably about 10,000 psi, and most preferably at least about 12,000 psi; and glass transition temperature (Tg) of at least about 50° C., preferably at least about 75° C., and most preferably, at least about 100° C.

Preferred examples of higher modulus fiber reinforcement material include carbon fibers, aramid fibers, glass fibers, polyolefin fibers, boron fibers, and the like. Most preferred is carbon fibers alone or in combination with other fibers.

Preferred examples of the plastic resin matrix or binder include plastic resins such as nylon, high-strength polyethylene, liquid crystalline polyethylene, epoxy resins, cyanurates, polyesters, and polyurethanes and the like. Most preferred is epoxy-type thermoset resins and nylon-type thermoplastic resins.

Generally, the high modulus fibers used herein are typically at least about 50 times stronger and at least about 20–150 times stiffer than the plastic resin matrix used herein. The role of the matrix is primarily that of a glue or binder that enables the high modulus fibers to support the applied loads.

In the composites used in the present invention, the ratio of high modulus fibers to plastic resin mixture is preferably from 30:70 to 70:30 by volume, more preferably, 40:60 to 60:40 by volume.

While numerous profiles or cross-sections may be used in forming the solid members, the specific profile will be chosen to achieve a certain set of desired, non-isotropic properties with no voids. For example, C channels and I-beam cross sections are commonly utilized to achieve greater stiffness and strength in one direction while minimizing materials usage. Alternatively, solid rods with no voids with circular or square cross sections are used in places which require higher damage tolerances or general robustness. Accordingly, weight limitations coupled with the specific cross-section geometry used define the final dimensions (e.g., mean diameter) of the solid member. An example of when a solid circular or square cross section may be required is when rivets or other connective fittings may be placed in holes made in the solid member. Another example where damage tolerances may have to greater are on parts that may be subject to repetitive, physical abuse.

Fiber angles of the composite tubing may be either a combination of high and low angles to the axis of the member to impart maximum rigidity and strength per unit weight or a single angle for ease of manufacturing and lower cost. If a combination of fibers is used, the angle combination should be preferably isotropic winding angles. In the case of member made from a single tow with a single angle, the preferred angle should fall between 0° and 50°, more preferably from 0° to 45°, and most preferably from 0° to 40°.

Overall member weight should be no more than 0.35 pounds per lineal foot, preferably no more than 0.17 pounds per lineal foot, and most preferably no more than 0.10 pounds per lineal foot.

The high modulus fibers and plastic resin matrix or binder combined to form composites used in the present invention by any standard composite fabrication technique. Pultrusion is one preferred method when economics of scale and high speed are required, especially when the core layer is being produced with an angle of 0°. Other alternative constructions are circ winding, filament winding, injection molding, braiding, resin transfer molding and roll wrapping as well as combinations of these techniques. The present invention also encompasses the use of the above-noted composites in tapered shafts (i.e., wherein one end of the solid composite has a larger diameter than the other end).

The composite members of the present invention as well as the connective fittings, supports, and folding mechanisms described herein may be made of any suitable materials, including molded plastics containing lightening fillers, such as microballoons and other low-density fillers, whose density is no more than 0.9 grams per cubic centimeter.

This invention has many unique and significant advantages over the prior art. In contrast to using either metal, thermosetplastic tubing, or thermoplastic tubing, using high modulus fiber plastic matrix reinforced composite tubing results in a dramatic reduction in frame weight without a loss of strength. This weight loss, without a loss in strength, provides for a stroller or baby carriage that can be easily and conveniently folded, stored, and carried. Long, high modulus fiber/plastic matrix reinforced composites are desired over short, high modulus fiber plastic matrix reinforced composites because of their overall superior strength and stiffness. Oriented, long, high modulus fiber plastic matrix reinforced composites are even more preferred because of their even more superior strength and stiffness. Additionally, high modulus fiber plastic matrix reinforced composites, because of their high stiffness, dimension stability, and acoustic properties, do not dampen or significantly distort sound. Accordingly, unlike unreinforced plastics or short, high modulus fiber/plastic matrix reinforced composites, high modulus fiber plastic matrix reinforce composites have metal-like properties and infer a quality appearance. Unlike metals and more easily than most plastics, composites may be readily coated for decorative purposes and will not corrode.

This invention further improves upon the construction of members made from fiber-reinforced plastic matrix composites. It has been found that certain types of constructions are more economical, are faster to produce, are less complex to manufacturer, minimize the amount of material used, and yet the final tubing still exhibits all of the desired properties. Specifically, a construction which utilized a single tow of fibers and a single fiber angle in the weave of the fibers within the tube is one of the most economical, fast, and least complex. In this invention, we have found that only certain angles of fiber for the desired specifications of the tubing will favor the desired tubing properties. Using angles outside of this range when only a single amount is utilized will produce tubing that will fail to perform as desired or that will fail to fall within the desired tubing specifications if the desired performance is achieved. These fiber angles generally fall between 0° and 50°. The use of multiple angles outside of this range can overcome some of these shortfalls, as has been previously described, but the manufacturing process is more complex, less favorable, is more expensive, and more time consuming. A common method of constructing solid rods is to use an angle of 0° for the core and where robustness and higher overall structural integrity is desired, a single or group of angles from 10° to 90° may be used for outer layers.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A rollable child carrier structure comprising a rollable base and a multi-side enclosing frame, wherein said frame comprises solid composite sections made of lightweight, high modulus fiber-reinforced plastic matrix composite solid members having a weight of 0.35 pounds or less per lineal foot, and wherein said plastic matrix is a thermoplastic resin or thermoset plastic resin with a minimum modulus of 250,000 psi; a minimum tensile strength of 6,000 psi; and a glass transition temperature of at least 50° C. and wherein said high modulus fiber reinforcement is selected form the group consisting of carbon fibers, aramid fibers, glass fibers, polyolefin fibers, boron fibers, and mixtures thereof.

2. The structure of claim 1 wherein said plastic matrix is an epoxy thermoset plastic.

3. The structure of claim 1 wherein said plastic matrix is a nylon thermoplastic resin with a minimum modulus of 325,000 psi and a minimum tensile strength of 10,000 and a thermoplastic resin $T_g$ of at least 75° C.

4. The structure of claim 1 wherein ratio of high modulus fibers to plastic matrix is from 70:30 to 30:70 by volume.

5. The structure of claim 1 wherein said composite tube is constructed by a pultrusion process.

6. The structure of claim 1 wherein the high modulus fibers are carbon fibers.

7. A rollable child carrier made of the solid composite sections of claim 1 and connective fittings, supports, and folding mechanisms consisting of molded plastics containing lightening fillers, whose density is no more than 0.9 grams per cubic centimeter.

8. The structure of claim 1 wherein the core of said solid member has an angle of 0° and the outer layers have an angle of between 10° and 90°.

* * * * *